United States Patent [19]
Weng et al.

[11] Patent Number: 5,765,216
[45] Date of Patent: Jun. 9, 1998

[54] DATA PROCESSOR WITH AN EFFICIENT BIT MOVE CAPABILITY AND METHOD THEREFOR

[75] Inventors: Chia-Shiann Weng; Paul M. Astrachan; Peter C. Curtis; Donald C. Anderson; Walter U. Kuenast; Kenneth C. Weng, all of Austin, Tex.

[73] Assignee: Motorola, Inc., Schaumburg, Ill.

[21] Appl. No.: 665,927

[22] Filed: Jun. 17, 1996

Related U.S. Application Data

[63] Continuation of Ser. No. 184,529, Jan. 21, 1994, abandoned.

[51] Int. Cl.⁶ .................................................. G06F 12/00
[52] U.S. Cl. .................................................. 711/214
[58] Field of Search .................................. 711/214, 220; 395/898

[56] References Cited

U.S. PATENT DOCUMENTS

| | | | |
|---|---|---|---|
| 4,409,653 | 10/1983 | Bruce, Jr. ........................... | 395/735 |
| 4,525,776 | 6/1985 | Eldumiati et al. ................... | 395/562 |
| 4,742,479 | 5/1988 | Kloker et al. ....................... | 364/746 |
| 5,077,659 | 12/1991 | Nagata ............................... | 395/386 |
| 5,084,814 | 1/1992 | Vaglica et al. ...................... | 395/306 |
| 5,121,474 | 6/1992 | Sakamura et al. .................. | 395/800.42 |
| 5,201,056 | 4/1993 | Daniel et al. ....................... | 395/800.41 |
| 5,210,835 | 5/1993 | Sakamura et al. .................. | 395/565 |
| 5,249,148 | 9/1993 | Catherwood et al. ............... | 364/571.01 |
| 5,398,319 | 3/1995 | Sakamura et al. .................. | 395/567 |

FOREIGN PATENT DOCUMENTS 0 382 246 A2  8/1990  European Pat. Off. ........ G06F 12/04

OTHER PUBLICATIONS

Guy R.L. Sohie et al., "A Digital Signal Processor with IEEE Floating–Point Arithmetic", 8207 I.E.E.E. Micro, Dec. 1988, No. 6+Index, NY, pp. 49–67.

Motorola, Inc.; "MC68020 32–Bit Microprocessor User's Manual;" Second Edition; Prentice–Hall, Inc., Englewood Cliffs, N.J.; (1984/85), pp. B–34 to B–36 and B–40 to B–41.

*Primary Examiner*—Jack A. Lane
*Attorney, Agent, or Firm*—Paul J. Polansky

[57] ABSTRACT

A data processor (40) includes source (60) and destination (61) address generation units (AGUs) to update source and destination addresses for efficient digital signal processing (DSP) functions. The data processor (40) includes an instruction decoder (41) which recognizes a bit movement instruction, which is frequently encountered in data interleaving operations. In response to the bit movement instruction, the instruction decoder (41) causes the source (60) and destination (61) AGUs to update their present addresses using variable offset values. The instruction decoder (41) further causes a bus controller (44) to convert these bit addresses to corresponding operand addresses and bit fields. The bus controller (44) accesses source and destination operands using the operand addresses. The instruction decoder (41) then causes an execution unit (45) to transfer a bit from the source operand indicated by the source bit field to a bit position of the destination operand indicated by the destination bit field.

24 Claims, 4 Drawing Sheets

| SOURCE 2 EFFECTIVE ADDRESS (16 BITS) | SOURCE 1 EFFECTIVE ADDRESS (16 BITS) | DESTINATION EFFECTIVE ADDRESS (16 BITS) | OPCODE (5 BITS) |
|---|---|---|---|

DATA PROCESSOR WITH AN EFFICIENT BIT MOVE CAPABILITY AND METHOD THEREFOR

This application is a continuation of prior application Ser. No. 08/184,529, filed Jan. 21, 1994 now abandoned.

FIELD OF THE INVENTION

This invention relates generally to data processors, and more particularly, to data processors for communications systems and the like.

BACKGROUND OF THE INVENTION

Microprocessor performance has improved continuously ever since the first commercial microprocessors were introduced in the mid 1970s. Some of the improvement has come about through the development of faster manufacturing processes. However, much of the improvement is attributable to increased integration of transistors in a single chip. As integration increased, microprocessors accessed larger and larger operands. Early microprocessors accessed data in 8-bit bytes, and had 8-bit internal architectures and 8-bit data paths. The next-generation of microprocessors included 16-bit microprocessors, such as the 8086 available from Intel. The Motorola 68000 provided an improvement over conventional 16-bit microprocessors by having an internal 32-bit architecture with a 16-bit external data path. Ultimately, microprocessors with both a 32-bit internal architecture and a 32-bit data path were introduced, such as the MC68020 available from Motorola, Inc.

While the increase in operand sizes greatly improved performance in general, additional enhancements were required to more efficiently perform digital signal processing algorithms such as adaptive filtering, equalization, and echo cancellation. To satisfy these needs, digital signal processors (DSPs), such as the Motorola DSP56000, were developed that were specifically adapted to performing digital signal processing tasks. These included such features as dedicated multiplier/accumulator (MAC) structures and multiple data and address buses to increase data processing throughput.

However, even though these enhancements greatly improved performance in general, they were unable to improve performance of certain applications, such as communications involving bit interleaving. Some communications systems specify bit interleaving and de-interleaving operations in order to reduce the effect of errors due to noise bursts. These bit interleaving operations provide increased immunity to noise bursts by spreading the data stream over several frames prior to transmission. Thus, since each transmitted frame now contains only a small number of bits from each frame in the data stream, a noise burst, which may corrupt the data in one transmitted frame, is likely to only affect bits that are widely scattered in the original data stream. Thus the effect on the original data stream is minimized and through redundancy built into the data encoding scheme, the receiver may thus be able to recover the correct data despite the noise burst.

Conventional data processors, however, do not efficiently perform the interleaving and de-interleaving operations. For example, a typical data processor first calculates the address of the operand which contains the source bit, then calculates the address of the operand which contains the destination bit position in which the source bit is to be written, fetches the source operand, applies a mask to the source operand to obtain the bit, writes the bit to the appropriate bit position of the destination operand, and stores the destination operand. This sequence requires approximately 6 to 10 instruction cycles on known microprocessors to complete. During long data transmission or reception sequences, the number of instruction cycles becomes excessive, resulting in increased CPU architectural complexity, clock speed, and higher power consumption. The high power consumption further decreases battery life in battery-based applications.

Moreover, some general-purpose data processors have bit move instructions which improve their performance over conventional data processors which do not have bit move instructions. However, further improvement is desirable. To address a specific bit in a buffer whose total length is an arbitrary number of internal processor words, known processors with bit movement instructions must first compute the address of the processor word which contains the desired source bit and the address (position) of that source bit within the word. Next, a similar computation must determine the address of the processor word which contains the destination bit and the address (position) of the destination bit within that word. Finally, the addressed source bit is moved into the addressed destination bit.

For example, in the Motorola 68020 class processor, the extract bit field (BFEXT) instruction moves a specified bit(s) in a source operand to the low-order bit(s) of a register. The insert bit field (BFINS) instruction moves the low-order bit(s) of this register to a specified position in a destination operand. The determination of the operand addresses and the bit positions within the operands for the source and destination from the given bit addresses in the arbitrary operand-length buffer, however, still require additional shift and/or masking instructions. What is needed, then, is a data processor which has the capability to perform these interleaving and de-interleaving operations more efficiently.

SUMMARY OF THE INVENTION

Accordingly, the present invention provides, in one form, a data processor with an efficient bit move capability, including an instruction decoder, an address generator, a bus controller, and an execution unit. The instruction decoder has an input for receiving one of a plurality of instructions including a bit move instruction, and an output for providing first, second, and third decoded signals in response to the bit move instruction. The address generator has source and destination portions. The source portion provides a present source address and updates the present source address according to a source offset, in response to the first decoded signal. The destination portion provides a present destination address and updates the present destination address according to a destination offset, in response to the second decoded signal. The bus controller has source and destination address inputs for receiving the present source and destination addresses, respectively. The bus controller calculates a source operand address and a source bit field from the present source address and a destination operand address and a destination bit field from the present destination address, in response to the third decoded signal. The execution unit is coupled to source and destination data paths and receives source and destination operands at addresses represented by the source and destination operand addresses, respectively. The execution unit moves a bit of the source operand selected by the source bit field into a bit position of the destination operand selected by the destination bit field, in response to the third decoded signal.

In another form, the present invention provides a method for efficiently moving bits between operands in a data processor. A present source address is converted to a source operand address and a source bit field. A present destination address is converted to a destination operand address and a destination bit field. A source operand is fetched from an address indicated by the source operand address. A destination operand is fetched from an address indicated by the destination operand address. A bit of the source operand selected by the source bit field is moved into a bit position of the destination operand selected by the destination bit field to provide an updated destination operand. The present source address is updated using a source offset. The present destination address is updated using a destination offset.

These and other features and advantages will be more clearly understood from the following detailed description taken in conjunction with the accompanying drawings.

DETAILED DESCRIPTION OF A PREFERRED EMBODIMENT

Figure 1:
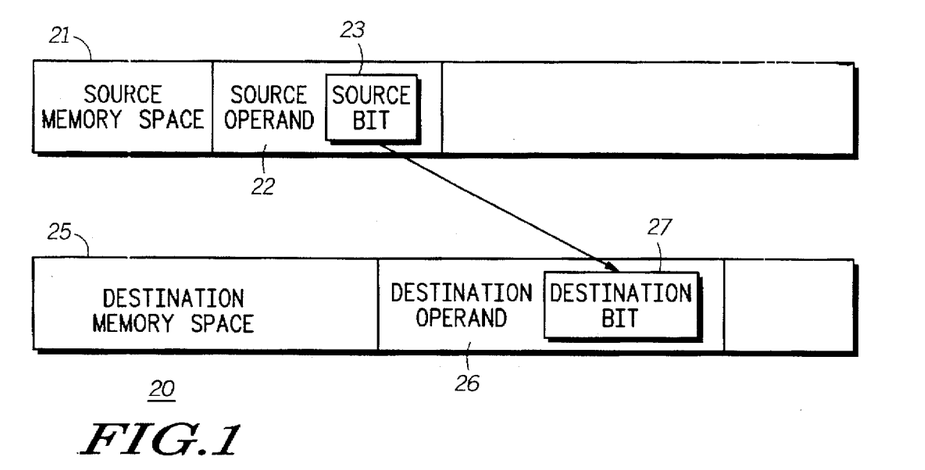
FIG. 1 illustrates in block diagram form a general bit movement operation.

FIG. 1 illustrates in block diagram form a general bit movement operation. This bit movement operation is illustrated in the context of a memory space 20 having a contiguous source memory space 21 and a contiguous destination memory space 25. Source memory space 21 and destination memory space 25 are not necessarily restricted to occupying separate spaces. Source memory space 21 includes n operands each having a given width such as 8-bit (byte), 16-bit (word), 32-bit (long word), etc. Within a source operand 22 of the given width, a source bit 23 is identified as the bit to be moved. Depending on the sequence of bit movements to be performed, source bit 23 may be located at any bit position in any of the operands in source memory space 21. Likewise, destination memory space 25 includes n operands of the given width. Within a destination operand 26 of the given width, a destination bit 27 is identified as the bit address to which source bit 23 is to be moved. Depending on the sequence of bit movements to be performed, destination bit 27 may be located at any bit position in any of the destination operands. In FIG. 1, an arrow represents a bit movement operation from source bit 23 to destination bit 27.

Figure 2:
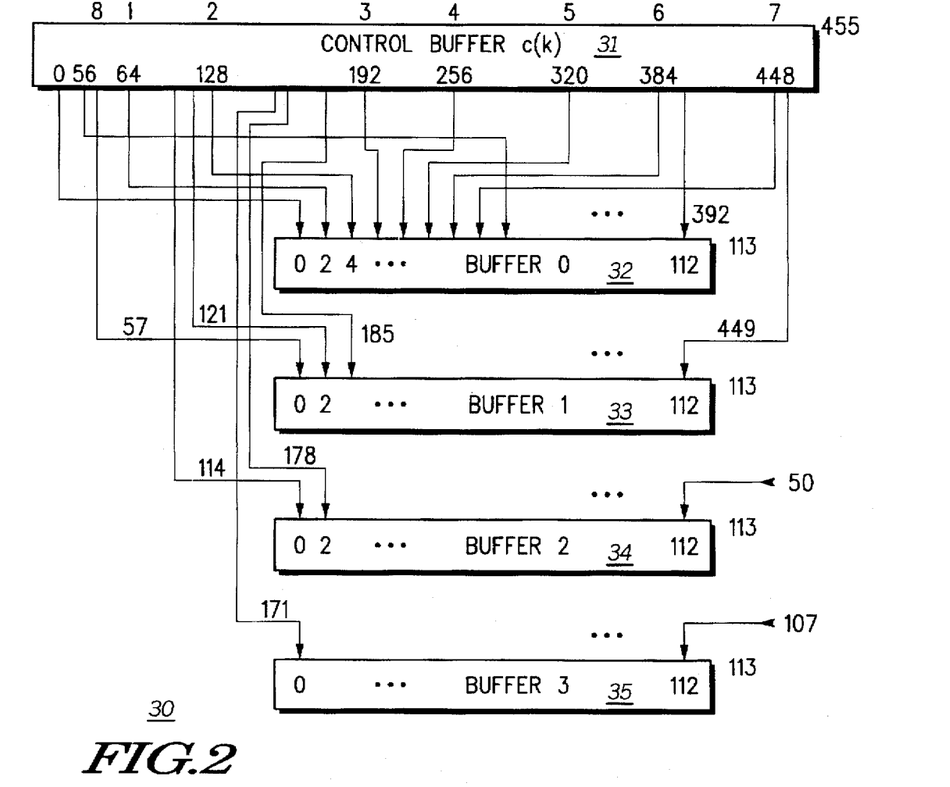
FIG. 2 illustrates in block diagram form a particular bit movement operation.

FIG. 2 illustrates in block diagram form a particular bit movement operation. This bit movement operation is an interleaving operation specified in the Groupe Speciale Mobile (GSM) cellular telephone standard known as the Stand-alone Dedicated Control Channel (SDCCH). The SDCCH interleaving example is illustrated in the context of a memory space 30 having a contiguous control buffer memory space 31 and four contiguous buffers 32–35.

As is depicted in FIG. 2, the GSM SDCCH control channel contains 456 bits that are interleaved over four bursts. These bits are interleaved according to the following rules:

For i=0 to 455
    B(n,j)=c(k)
    k=(64*i+Floor(i/57)*57) % 456
    j=i*2% 114+Floor(i/228)
    n=Floor(i/57) % 4 where c(k) is the input buffer (456 bits), n is the Burst (0–3), j is the interleaved bit (0–113), and % represents the modulo operation. Conventional processors do not have the capability to efficiently implement the SDCCH interleaving scheme shown above, because they do not provide the indexed modulo addressing modes combined with the required bit movement capability within a single instruction.

Figure 3:
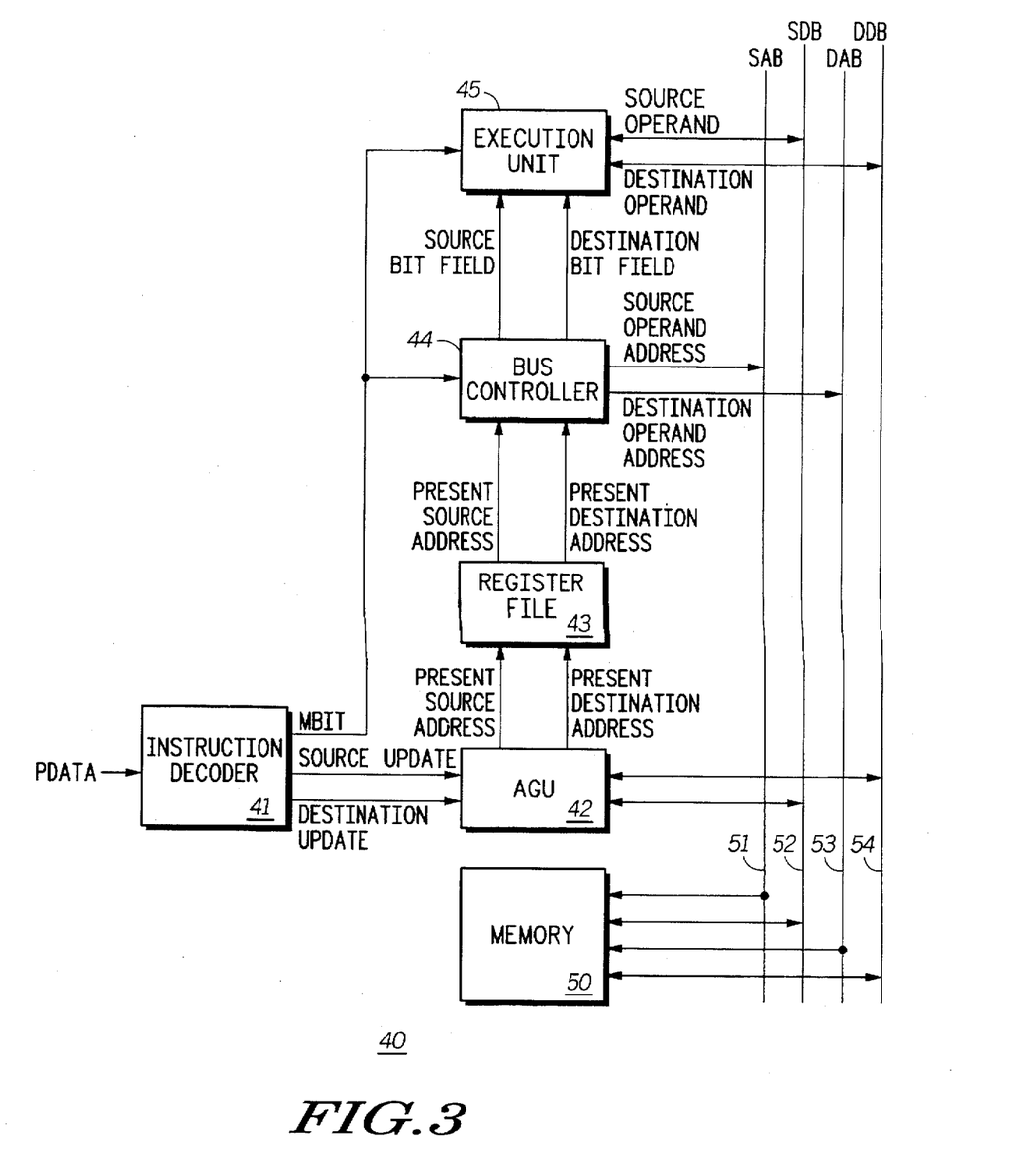
FIG. 3 illustrates in block diagram form a data processor with an efficient bit move capability according to the present invention.

FIG. 3 illustrates in block diagram form a data processor with an efficient bit move capability 40 according to the present invention. Data processor 40 includes generally an instruction decoder 41, an address generation unit (AGU) 42, a register file 43, a bus controller 44, and an execution unit 45. In the illustrated embodiment, data processor 40 is connected indirectly to a memory 50 through a source address bus (SAB) 51, a source data bus (SDB) 52, a destination address bus (DAB) 53, and a destination data bus (DDB) 54. In other embodiments, memory 50 and buses 51–54 may be external to data processor 40.

Instruction decoder 41 has an input for receiving data labelled "PDATA", which represents any of a number of instructions to be executed by data processor 40. The actual set of instructions that instruction decoder 41 responds to will vary from embodiment to embodiment but typically includes data movement instructions, arithmetic and logical instructions, and the like. In particular, instruction decoder 41 is responsive to a bit movement instruction designated an "MBIT" instruction, which copies a selected bit within a source memory space into a selected bit position within a destination memory space, such as during the GSM SDDCH control frame data interleaving algorithm illustrated in FIG. 2. In response to the MBIT instruction, instruction decoder 41 provides three decoded control signals, labelled "SOURCE UPDATE", "DESTINATION UPDATE", and a control bit also labelled "MBIT".

AGU 42 is an address generator with modulo-addressing capabilities which allow it to efficiently perform digital signal processing (DSP) functions. AGU 42 has two portions capable of performing independent source and destination address calculation. A first portion is responsive to signal SOURCE UPDATE in order to update a present source address to a next source address according to a source offset and a source modulus value. Likewise, a second portion is responsive to signal DESTINATION UPDATE in order to update a present destination address to a next destination address according to a destination offset and a destination modulus value. AGU 42 is connected to memory 50 via SDB 52 and DDB 54 to receive the initial addresses and offset and modulus values for use in the source and destination address updates.

AGU 42 provides the present calculated address values, labelled "PRESENT SOURCE ADDRESS" and "PRESENT DESTINATION ADDRESS", to register file 43, which stores these values for presentation to bus controller 44. AGU 42 updates these address while bus controller 44 is using them, i.e., performs a post-update. However, in other embodiments, AGU 42 could perform a pre-update as well.

Bus controller 44 receives the PRESENT SOURCE ADDRESS and PRESENT DESTINATION ADDRESS from register file 43, and provides two corresponding operand addresses, labelled "SOURCE OPERAND ADDRESS" and "DESTINATION OPERAND ADDRESS" to SAB 51 and DAB 53, respectively. In addition, bus controller 44 provides additional control signals which are not illustrated in FIG. 3. Bus controller 44 provides the SOURCE OPERAND ADDRESS and DESTINATION OPERAND ADDRESS differently according to the type of instruction. During most instructions, the SOURCE OPERAND ADDRESS and DESTINATION OPERAND ADDRESS are identical to the PRESENT SOURCE ADDRESS and PRESENT DESTINATION ADDRESS, respectively.

However, bus controller 44 recognizes that the PRESENT SOURCE ADDRESS and PRESENT DESTINATION ADDRESS represent bit addresses in response to signal MBIT. During the MBIT instruction, bus controller 44 separates the PRESENT SOURCE ADDRESS into two fields, the SOURCE OPERAND ADDRESS and a field labelled "SOURCE BIT FIELD", which bus controller 44 provides to execution unit 45. Likewise, bus controller 44 separates the PRESENT DESTINATION ADDRESS into two fields, the DESTINATION OPERAND ADDRESS and a field labelled "DESTINATION BIT FIELD", which bus controller 44 provides to execution unit 45.

The relationship between the present address, operand address, and bit field during the MBIT instruction depends on the number of bits per operand. In general, bus controller 44 divides the present address by the number of bits in the operand to provide the operand address. The bit field is an encoded signal to select one bit of a number of bits equal to the number of bits per operand.

For example, for an 8-bit (byte) operand size, the operand address would be equal to the present address divided by 8, and the bit field would be the three least significant bits of the present address. In general, the number of bits per operand is completely arbitrary, although bus controller 44 and execution unit 45 can be implemented more easily with an operand size which is an integer power of two. In addition, data processing systems most frequently organize memory into byte, 16-bit (word), and 32-bit (long word) sizes.

Execution unit 45 has inputs for receiving the SOURCE BIT FIELD and the DESTINATION BIT FIELD, a control input for receiving signal MBIT, and bidirectional connections to SDB 52 for conducting a data element labelled "SOURCE OPERAND", and to DDB 54 for conducting a data element labelled "DESTINATION OPERAND". In response to signal MBIT, bus controller 44 provides the SOURCE OPERAND ADDRESS and control signals, not shown, to access the SOURCE OPERAND, which is received by execution unit 45. Simultaneously, bus controller 44 provides the DESTINATION OPERAND ADDRESS and control signals, not shown, to access the DESTINATION OPERAND, which is also received by execution unit 45. Execution unit 45 then copies a bit of the SOURCE OPERAND selected by the SOURCE BIT FIELD, into a bit position of the DESTINATION OPERAND selected by the DESTINATION BIT FIELD. In a subsequent memory cycle, bus controller 44 again provides the DESTINATION OPERAND ADDRESS and control signals to store the result of the MBIT instruction as an updated DESTINATION OPERAND, provided by execution unit 45.

The overall advantages of the MBIT capability of data processor 40 are to efficiently combine source and destination operand addresses and bit position addresses with bit movement execution in one machine instruction which has the same execution time as all other instructions of the processor. The MBIT instruction effectively converts a byte addressable processor into a bit addressable processor for source and destination addresses combined with bit movement execution.

Data processor 40 implements one bit interleave operation in each machine cycle. In the same cycle, the positions of the subsequent source and destination bit locations are calculated and updated. In contrast, known data processors in general, consume a large number of CPU cycles during each interleave operation generating the byte and bit locations for the source and destination operands. Depending on the processor used, typically 6 to 10 cycles are required to perform a single bit interleave operation.

A code segment illustrating the use of the MBIT instruction to perform the SDCCH interleaving operation is shown below:

```
/*Initialization */
  m o v   #(inputdata_buffer*8), r10
  m o v   #(outputdata_buffer*8), r11
/* interleaving */
DO    #4, r5
loopeven:
      rep    #57, r4
             MBIT    (r10.b+64, %456), (r11.b+2)
      nop    (r10.b+57), (r11.b+4) /* offset to next burst buffer */
ENDDO    r5, loopeven
``` where "mov" represents a data movement instruction from memory to an on-chip register, "#" represents immediate data, "r$_j$" represents the jth register, "DO" represents a do loop, "rep" represents a repeat instruction, and "nop" represents a no-operation instruction (which still allows address register updates). Memory space 20, which stores the MBIT "SOURCE" and "DESTINATION" operands, can be integrated on the silicon, located off-chip, or be partly on-chip and partly off-chip.

The advantage of placing the address separation in bus controller 44, is that alternate address generators or sources can be used without affecting the structure of AGU 42 itself. Fixed address data port(s) is one example where the address could be provided by a register or read-only memory (ROM) as a register indirect address or absolute address. This would be advantageous in a multi-processor system.

Figure 4:
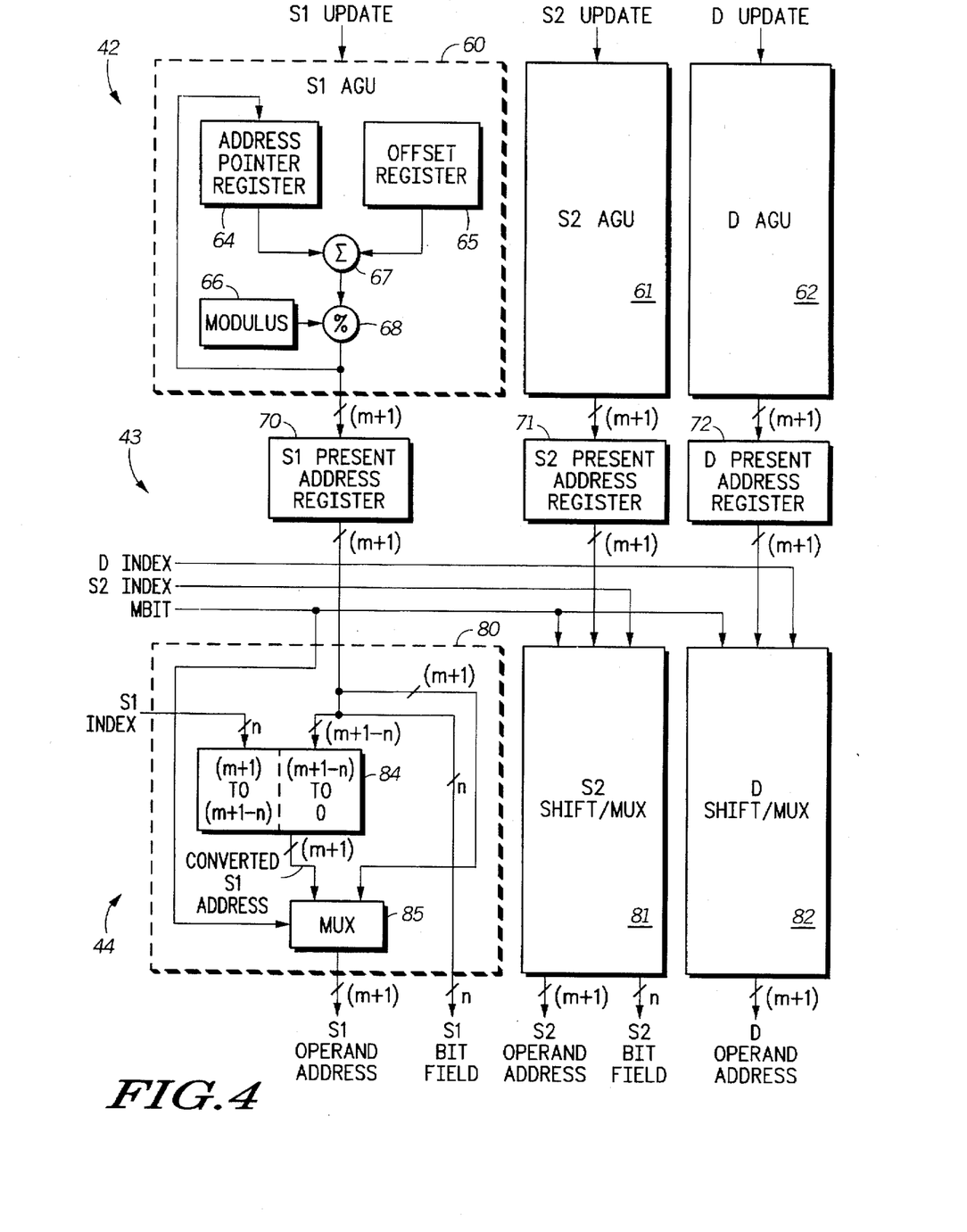
FIG. 4 illustrates in partial block and partial logic diagram form one portion of the data processor of FIG. 3.

FIG. 4 illustrates in partial block and partial logic diagram form one portion of data processor 40 of FIG. 3. This portion of data processor 40 further illustrates AGU 42, register file 43, and bus controller 44, and the same reference numbers are used to identify these blocks in FIG. 4 as well. AGU 42 includes generally three AGUs, namely an "S1" AGU 60, an "S2" AGU 61, and a "D" AGU 62. During an MBIT instruction, one of these AGUs, preferably S1 AGU 60, is chosen as the source AGU, and another one of these AGUs, preferably S2 AGU 61, is chosen as the destination AGU. Each AGU performs an identical function, of which only AGU 60 will be illustrated in detail.

AGU 60 includes an address pointer register 64, an offset register 65, a modulus register 66, a summing device 67, and a divider 68. S1 AGU 60 is operative in response to a signal labelled "S1 UPDATE", which in the illustrated embodiment is the same as signal SOURCE UPDATE. Address pointer register 64 includes either the initial address or the address value calculated at the last update, and provides this value to one input of summing device 67. Offset register 65 provides the present offset, and modulus register 66 the present modulus. Note that the offset and modulus values may be updated from time to time. Summing device 67 adds the offset provided by offset register 65 to the present address value provided by address pointer register 64, to provide a sum thereof. This sum is then brought within the range specified by the modulus value in divider 68, which divides the sum of the address plus the offset by the modulus value. AGU 61 may be implemented by well-known modulo adjusting circuitry, such as that disclosed by Kloker in U.S. Pat. No. 4,742,479, entitled "Modulo Addressing Unit Having Arbitrary Offset and Modulo Values," issued May 3, 1988, which is herein incorporated by reference.

The SDCCH algorithm requires the MBIT instruction to be used in the following form:

$$MBIT(r_a+64, \% 456), (r_b+2)$$

where $r_a$ and $r_b$ refer to internal registers in the register file of data processor 40. The first part of this instruction accesses the source bit using the indirect address specified by register $r_a$, and subsequently calculates the position of the next source bit by adding 64 to the present $r_a$ value according to a modulus of 456. The second part of the instruction stores the destination bit using the indirect bit position specified by register $r_b$, and calculates the position of the next destination bit by adding 2 to the present $r_b$ value.

Each of AGUs 60–62 provide an address value having (m+1) bits to register file 43. Register file 43 includes three registers 70–72 for storing the output of AGUs 60–62, respectively. The outputs of registers 70–72 are thereafter available for use in bus controller 44. Bus controller 44 includes three shifter/multiplexers (SHIFT/MUXes) 80–82. SHIFT/MUXes 80–82 each have inputs for receiving outputs of a corresponding one of registers 70–72, control inputs for receiving signal MBIT, inputs for receiving a corresponding index labelled "S1 INDEX", "S2 INDEX", and "D INDEX", respectively, and outputs for providing a corresponding operand address. In addition, SHIFT/MUXes 80 and 81 have outputs for providing a corresponding bit field.

By way of illustration, SHIFT/MUX 80 includes a bit shifter 84 and a multiplexer 85. Bit shifter 84 converts a present address labelled the "PRESENT S1 ADDRESS", a bit address, to a "CONVERTED S1 ADDRESS", an (m+1)-bit address accessing 8-bit (byte) operands. Bit shifter 84 in essence divides the PRESENT S1 ADDRESS by 8, by mapping the (m+1–n) most significant bits of the PRESENT S1 ADDRESS to bit positions (m+1–n) to 0 of the CONVERTED S1 ADDRESS. Bit shifter 84 also maps n-bit S1 INDEX onto the n most-significant bit positions of the CONVERTED S1 ADDRESS. MUX 85 has a first input for receiving the CONVERTED S1 ADDRESS, a second input for receiving the PRESENT S1 ADDRESS, a control input for receiving signal MBIT, and an output for providing the S1 OPERAND ADDRESS. In the illustrated embodiment, S1 OPERAND ADDRESS is the same as the SOURCE OPERAND ADDRESS. The S1 BIT FIELD, which in the illustrated embodiment is the same as the SOURCE BIT FIELD, is taken as the n least significant bits of the PRESENT S1 ADDRESS.

Figure 6:
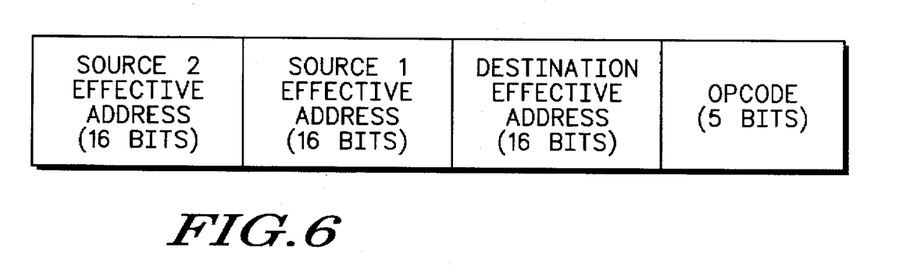
FIG. 6 illustrates in block diagram form an instruction format which may be used for the MBIT instruction.

AGU 42 is a conventional circular buffer AGU. The modest addition of the shifter/multiplexer in bus controller 44 facilitates the implementation of the MBIT instruction by separating the operand address portion from the bit field address portion of the present address as calculated by the AGU. One example of an actual instruction format which may recognized by data processor 40 for the MBIT instruction is shown in FIG. 6. This format enables the use of S1 AGU 60, S2 AGU 61, and D AGU 62 to allow a bit to be extracted from a bit position in one source location, inserted into an operand from a second location, with the result stored into a destination location. However, if there is only a need to copy a bit from one source location and store it into a destination location, then the assembler is programmed to recognize this syntax, as set forth above, to copy one source field into the destination field.

Figure 5:
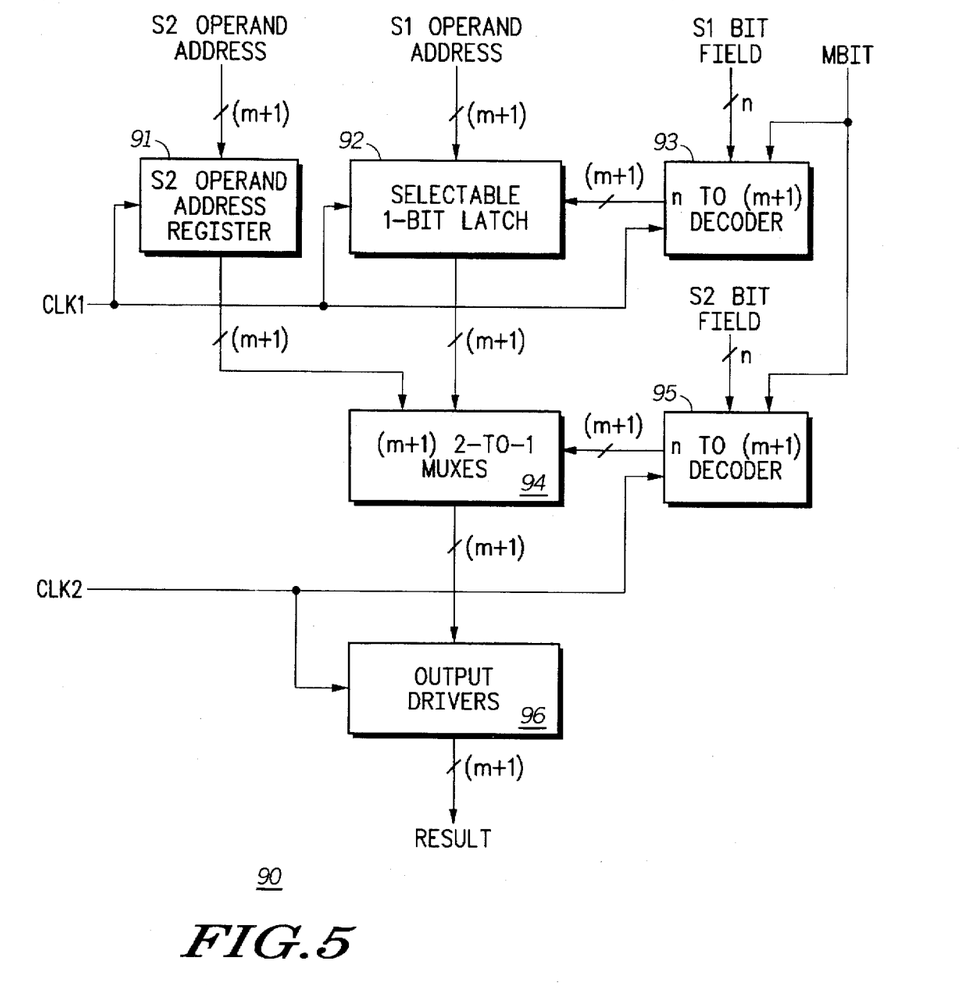
FIG. 5 illustrates in block diagram form a portion of the execution unit of FIG. 3 for performing bit move instructions.

FIG. 5 illustrates in block diagram form a portion of execution unit 45 of FIG. 3 for performing bit move instructions, designated MBIT portion 90. MBIT portion 90 includes those blocks of execution unit 45 relevant to the MBIT instruction. Note that execution unit 45 also performs additional operations including multiplications, multiply-and-accumulates, additions, and the like. However, the blocks which perform these conventional operations are not shown in FIG. 5.

MBIT portion 90 is operative to complete the MBIT instruction in one clock cycle. This clock cycle is divided in half by two nonoverlapping clock signals labelled "CLK1" and "CLK2". A register 91 labelled "S2 OPERAND ADDRESS REGISTER" latches the (m+1)-bit S2 OPERAND ADDRESS from bus controller 44 in response to clock signal CLK1. A latch portion 92 includes a selectable 1-bit latch receiving one of the (m+1) bits in the S1 OPERAND ADDRESS, selected by (m+1) corresponding select signals, and is operative in response to signal CLK1. A decoder 93 provides these select signals by decoding the n-bit S1 BIT FIELD into (m+1) select signals. Decoder 93 also has a control input for receiving signal MBIT and a clock input for receiving signal CLK1.

Register 91 and latch portion 92 each has an (m+1)-bit output which is provided to corresponding inputs of a set of (m+1) 2-to-1 MUXes 94. MUXes 94 also have (m+1) control inputs for receiving corresponding ones of a set of (m+1) select signals. A decoder 95 provides these select signals by decoding the n-bit S2 BIT FIELD into (m+1) select signals. Decoder 93 also has a control input for receiving signal MBIT and a clock input for receiving signal CLK2. MUXes 94 have an (m+1)-bit output connected to an input of an output drivers block 96. Output drivers block 96 has an output for providing an (m+1)-bit output labelled "RESULT", and a clock input for receiving signal CLK2.

In general terms, MBIT portion 90 is a dedicated hardware module for the MBIT instruction which is simple and occupies only a small amount of integrated circuit area. The instruction decode and bit field decodes occur in the clock phase prior to the execution clock. This allows the destination operand and the selected bit in the source operand to be latched in the first phase of the execution clock cycle (CLK1). Then, in the second phase of the execution clock cycle (CLK2), the latched bit of the source operand is multiplexed into the selected bit of the destination operand, and the result is driven out through output drivers 96. This operation results in a single-clock execution of moving the addressed bit in the source operand into the addressed bit position of the destination operand.

The combined effect of the AGU, bus controller, and execution unit achieve an efficient implementation of the bit movement function which results in fewer processor cycles being required to complete the data interleaving/deinterleaving requirement of the GSM standard. Since all transmitted data are interleaved in GSM, the MBIT capability of the processor allows for substantially fewer instruction cycles and correspondingly lower power consumption which is critical to a battery-powered application.

While the invention has been described in the context of a preferred embodiment, it will be apparent to those skilled in the art that the present invention may be modified in numerous ways and may assume many embodiments other than that specifically set out and described above. For example, the embodiment discussed above places a limit on the physical location of a memory buffer to a $2^k$ boundary. To remove this limitation, alternate indexing or address offset computations schemes may be implemented by address SHIFT/MUXes 81 and 82. Also, the bit movement instruction may have a different syntax besides that set out above. Furthermore, a data processor may implement the bit movement instruction using AGUs without modulo addressing capabilities. Accordingly, it is intended by the appended claims to cover all modifications of the invention which fall within the true spirit and scope of the invention.

We claim:

1. A data processor with an efficient bit move capability, comprising:

an instruction decoder having an input for receiving one of a plurality of instructions including a bit move instruction, and an output for providing first, second, and third decoded signals in response to said bit move instruction;

an address generator coupled to said instruction decoder, having source and destination portions thereof;

said source portion providing a present source address and updating said present source address according to a source offset, in response to said first decoded signal;

said destination portion providing a present destination address and updating said present destination address according to a destination offset, in response to said second decoded signal;

a bus controller having source and destination address inputs for receiving said present source and destination addresses, respectively, for calculating a source operand address and a source bit field from said present source address and a destination operand address and a destination bit field from said present destination address, in response to said third decoded signal; and an execution unit coupled to source and destination data paths for receiving source and destination operands at addresses represented by said source and destination operand addresses, respectively, for moving a bit of said source operand selected by said source bit field into a bit position of said destination operand selected by said destination bit field, in response to said third decoded signal.

2. The data processor of claim 1 wherein said bus controller comprises:

a source address converter having an input for receiving said present source address, and an output for providing a converted source address, said source address converter dividing said present source address by a number of bits of said source operand to form said converted source address; and a source multiplexer having a first input for receiving said present source address, a second input for receiving said converted source address, a control input for receiving said third decoded signal, and an output for providing said source operand address.

3. The data processor of claim 1 wherein said bus controller comprises:

a destination address converter having an input for receiving said present destination address, and an output for providing a converted destination address, said destination address converter dividing said present destination address by a number of bits of said destination operand to form said converted destination address; and a destination multiplexer having a first input for receiving said present destination address, a second input for receiving said converted destination address, a control input for receiving said third decoded signal, and an output for providing said destination operand address.

4. The data processor of claim 1 wherein each of said source and destination operands are characterized as being byte operands, and wherein each of said source and destination operand addresses are byte addresses.

5. The data processor of claim 1 wherein said instruction decoder further provides said first and second decoded signals in response to predetermined ones of said plurality of instructions other than said bit move instruction.

6. The data processor of claim 1 wherein said address generator comprises an address generation unit (AGU), said source portion thereof being further responsive to a source modulus.

7. The data processor of claim 1 wherein said address generator comprises an address generation unit (AGU), said destination portion thereof being further responsive to a destination modulus.

8. A data processor with an efficient bit move capability, comprising:

decoding means for receiving one of a plurality of instructions including a bit move instruction, and for providing first, second, and third decoded signals in response to said bit move instruction;

source address generation means for providing a present source address and for updating said present source address according to a source offset, in response to said first decoded signal;

destination address generation means for providing a present destination address and for updating said present destination address according to a destination offset, in response to said second decoded signal;

bus access means for receiving said present source and destination addresses, for calculating a source operand address and a source bit field from said present source address and a destination operand address and a destination bit field from said present destination address, in response to said third decoded signal, and for fetching source and destination operands at locations indicated by said source operand address and said destination operand address, respectively; and bit movement means coupled to said bus access means, for moving a bit of said source operand selected by said source bit field into a bit position of said destination operand selected by said destination bit field, in response to said third decoded signal.

9. The data processor of claim 8 wherein said bus access means comprises means for storing said destination operand including said bit position thereof selected by said destination bit field, at said destination operand address.

10. The data processor of claim 8 wherein said source address generation means further updates said present source address according to a source modulus.

11. The data processor of claim 8 wherein said destination address generation means further updates said present destination address according to a destination modulus.

12. A method for efficiently moving bits between operands in a data processor, comprising the steps of:

receiving a bit move instruction;

and in response to receiving said bit move instruction performing the steps of:

converting a present source address to a source operand address and a source bit field, wherein said present source address is a bit address;

converting a present destination address to a destination operand address and a destination bit field, wherein said present destination address is a bit address;

fetching a source operand from an address indicated by said source operand address;

fetching a destination operand from an address indicated by said destination operand address;

moving a bit of said source operand selected by said source bit field into a bit position of said destination operand selected by said destination bit field to provide an updated destination operand;

updating said present source address using a source offset; and updating said present destination address using a destination offset.

13. The method of claim 12 wherein said step of converting said present source address to said source operand address and said source bit field comprises the step of converting said present source address to said source operand address by dividing said present source address by a number of bits in said source operand.

14. The method of claim 13 wherein said step of converting said present source address to said source operand address by dividing said present source address by said number of bits in said source operand, comprises the step of shifting said present source address by a predetermined number to obtain said source operand address, wherein said number of bits in said source operand is equal to two raised to a power of said predetermined number.

15. The method of claim 14 wherein said step of converting said present destination address to said destination operand address and said destination bit field comprises the step of converting said present destination address to said destination operand address by dividing said present destination address by a number of bits in said destination operand.

16. The method of claim 15 wherein said step of converting said present destination address to said destination operand address by dividing said present destination address by said number of bits in said destination operand, comprises the step of shifting said present destination address by a predetermined number to obtain said destination operand address, wherein said number of bits in said destination operand is equal to two raised to a power of said predetermined number.

17. The method of claim 12 further comprising the step of storing said updated destination operand at said destination operand address.

18. The method of claim 12 further comprising the step of simultaneously performing said steps of converting said present source address to said source operand address and said source bit field and converting said present destination address to said destination operand address and said destination bit field.

19. The method of claim 12 wherein said step of updating said present source address further comprises the step of updating said present source address using said source offset and a source modulus.

20. The method of claim 12 wherein said step of updating said present destination address further comprises the step of updating said present destination address using said destination offset and a destination modulus.

21. In a data processor having a source address generator for updating a source operand address according to a source base address and a source offset, and a destination address generator for updating a destination operand address according to a destination base address and a destination offset, a method of efficiently implementing a bit move operation, comprising the steps of:

receiving a bit move instruction; and in response to receiving said bit move instruction performing the steps of:

providing source and destination bit addresses respectively to said source and destination address generators in response to the bit move instruction;

converting an output of said source address generator to a source operand address and a source bit field;

converting an output of said destination address generator to a destination operand address and a destination bit field;

fetching a source operand at an address indicated by said source operand address;

fetching a destination operand at an address indicated by said destination operand address; and moving a bit of said source operand selected by said source fit field into a bit position of said destination operand selected by said destination bit field to provide an updated destination operand.

22. In a data processor for use with a memory which couples an operand to a data bus in response to receiving a corresponding address, wherein the operand includes a plurality of bits, a method for efficiently moving a bit from a source bit position in the memory to a destination bit position in the memory comprising the steps of:

receiving a bit move instruction which specifies a source bit address and a destination bit address;

and in response to receiving said bit move instruction, performing the steps of:

calculating a source operand address and a source offset using said source bit address;

calculating a destination operand address and a destination offset using said destination bit address;

fetching a source operand corresponding to said source bit address using said source operand address;

fetching a destination operand corresponding to said destination bit address using said destination operand address;

extracting the bit from said source operand using said source offset; and inserting the bit into said destination operand using said destination offset.

23. The method of claim 22 further comprising the step of performing said step of calculating said source operand address and said source offset using a source address generation unit.

24. The method of claim 22 further comprising the step of performing said step of calculating said destination operand address and said destination offset using a destination address generation unit.

* * * * *